No. 844,466. PATENTED FEB. 19, 1907.
C. H. PRÖTT.
APPARATUS FOR MOISTENING THE AIR AND DISTRIBUTING WATER AND OTHER FLUIDS.
APPLICATION FILED SEPT. 21, 1905.

2 SHEETS—SHEET 1.

Witnesses:
Otto König
J. a. Rittershaus

Inventor:
Carl Heinrich Prött

No. 844,466. PATENTED FEB. 19, 1907.
C. H. PRÖTT.
APPARATUS FOR MOISTENING THE AIR AND DISTRIBUTING WATER AND OTHER FLUIDS.
APPLICATION FILED SEPT. 21, 1905.
2 SHEETS—SHEET 2.
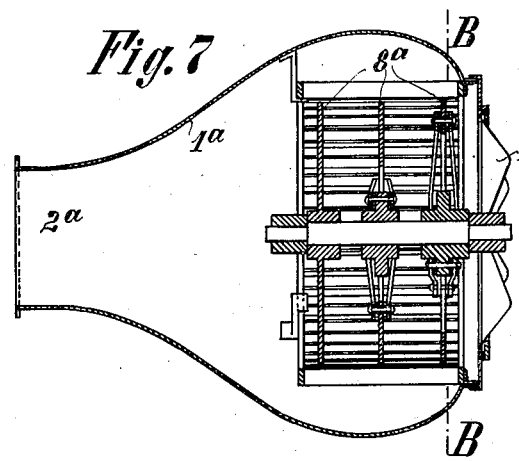
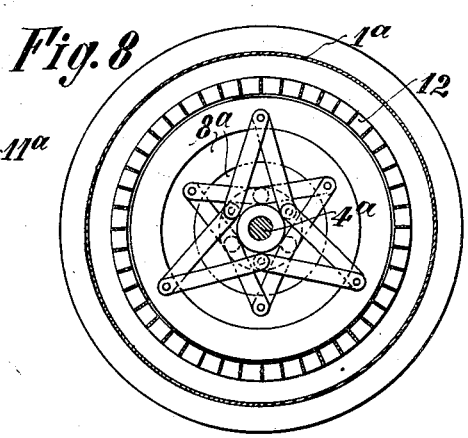
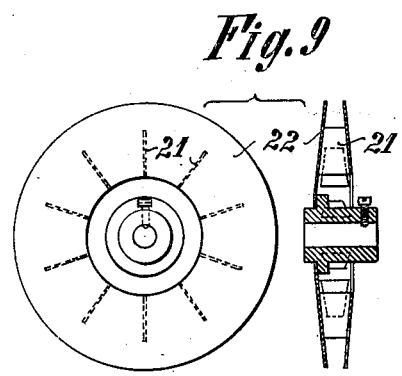
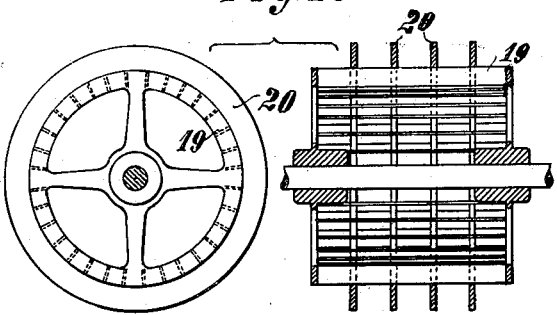
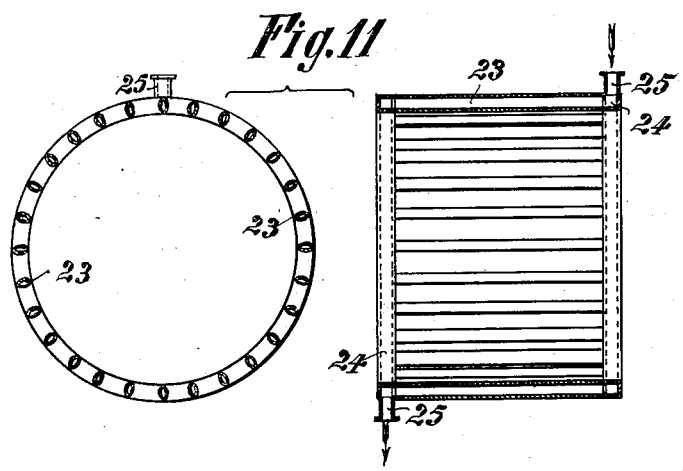
Witnesses:
Inventor:
Carl Heinrich Prött

UNITED STATES PATENT OFFICE.

CARL HEINRICH PRÖTT, OF RHEYDT, GERMANY.

APPARATUS FOR MOISTENING THE AIR AND DISTRIBUTING WATER AND OTHER FLUIDS.

No. 844,466.  Specification of Letters Patent.  Patented Feb. 19, 1907.

Application filed September 21, 1905. Serial No. 279,459.

*To all whom it may concern:*

Be it known that I, CARL HEINRICH PRÖTT, a citizen of the German Empire, residing at Rheydt, in the Province of Rhenish Prussia and Kingdom of Prussia, have invented certain new and useful Improvements in Apparatus for Moistening the Air and Distributing Water and other Fluids, of which the following is a specification.

This invention relates to improvements in apparatus for moistening the air and distributing water and other fluids in form of a spray by means of centrifugal force.

The new apparatus distinguishes itself from known devices for the same purpose by this, that the distributing-disks, with their circular edge, are running in the water and that they are mounted and turned on a horizontal shaft. By this arrangement it is possible to place a fan at each side of the distributing-disks on the same shaft where desired and to construct the apparatus in various ways suited for attachment to the ceiling or the floor of a room or also against the wall, as will be seen by the following description and from the annexed drawings, in which—

Figure 1:
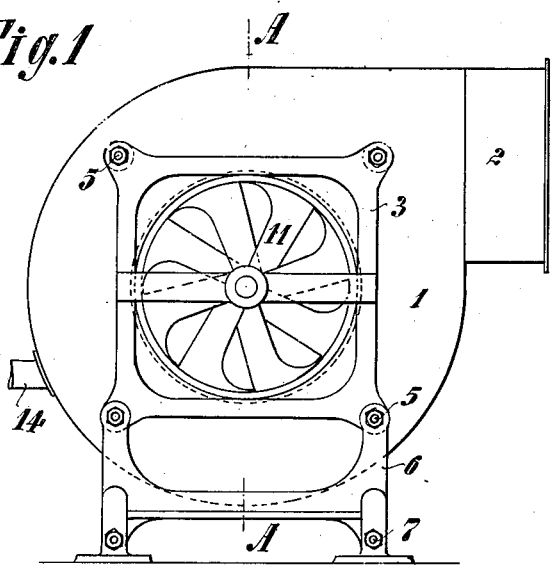
Figure 2:
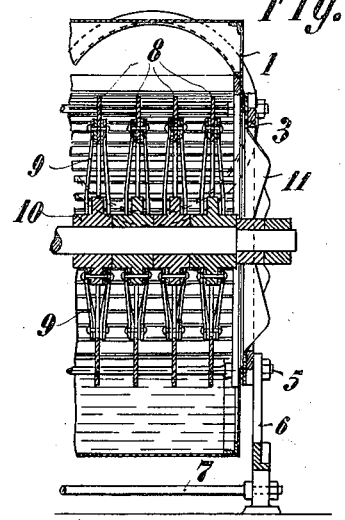
Figure 3:
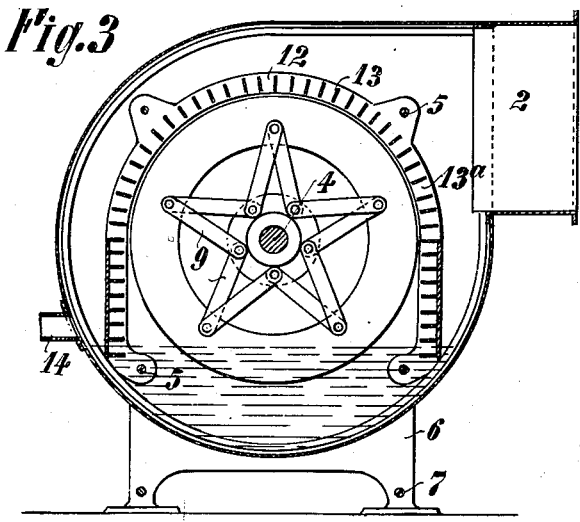
Figure 4:
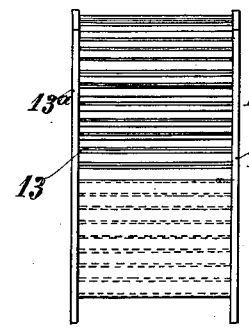
Figure 5:
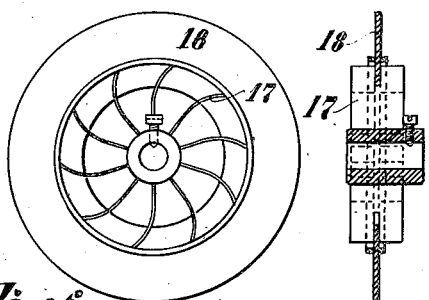
Figure 6:
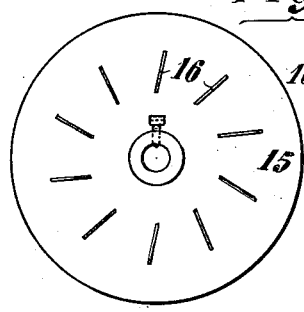

Figure 1 is a side view of one construction; Fig. 2, a cross-section along line A A of Fig. 1, and Fig. 3 is a longitudinal section, while Figs. 4, 5, and 6 show details. Figs. 7 and 8 show another construction in cross-section and in a longitudinal section. Figs. 9, 10, and 11 show details of construction.

In the first example shown, 1 indicates the casing, similar in form to the casing of a fan, with a central opening on one side for the entrance of the air and with a discharge-opening 2. The casing is carried on two frames 3, on which is also journaled the shaft 4. The frames and the casing are bolted together by bolts 5, by which are also connected the standards 6 to the frames 3, and bolts 7 stiffen and connect together the standards 6. The frames 3 are in the main of square shape, so that the standards may be fixed thereto on any side for mounting the apparatus against a wall or against a ceiling or in an upright position on the table or on a floor. The latter arrangement is shown in Fig. 1 in full lines, and in dotted lines is indicated how the machine can be suspended on a ceiling.

On the shaft 4 are fixed one or more distributing-disks 8, which may be constructed as full disks or as rings, which are jointed to their bosses or hubs 10 by spokes 9. In the central opening of the casing the fan 11 is fixed to the shaft 4, and a similar fan may be arranged on the opposite side of the casing, and the shaft 4 may be set in quick motion by any suitable and convenient means, be it by an electromotor direct or by a belt and pulley from some main shafting. The distributing-disks 8 are surrounded by a ring 12, composed of baffle-plates 13, forming small cells into and against which the fluid raised and dispersed by the disks is thrown for further distribution. The plates 13 are fixed in circular or half-circular or arch-shaped bars 13ª.

The manner of working of the apparatus shown and described is as follows: By a pipe 14 the fluid to be scattered is led into the lower part of the casing 1 just sufficient to touch the edges of the disks 8. In consequence of the quick rotation of the disks they will carry up part of the fluid and throw it out in a tangential direction against the baffle-plate 13. At the same time the fan or fans 11 drive a strong current of air into the apparatus, which is thrown against the faces of the ring disks and through between them and then goes off in a radial direction and is also thrown against the baffle-plates, together with the dispersed fluid, and it thus carries the latter away in an exceedingly fine spray or mist. As indicated above, the disks may be made solid or in ring shape. A good plan is to make the outer disks in an apparatus having fans at each side of the casing in ring shape and the central one solid. The latter then causes the stream of air entering in an axial direction to be thrown out in a radial direction. The fan or fans may also be directly connected or united with the distributing-disks. Fig. 6 shows this manner of construction, where wings 16 are fixed direct to the solid disks 15.

According to Fig. 5 the arms 17, carrying the ring disks 18, are constructed so as to form at the same time the wings of the ring disks 18. Fig. 9 shows another modification, where the wings 21 of the fan are arranged between the disks 22, one of them being solid, the other one ring-shaped.

A very practical construction is shown by Fig. 10. A fan having radially-arranged wings or plates 19, a so-called "sirocco" ventilator, is surrounded by a set of ring disks 20, these being carried by the plates 19, which themselves are held between two rims fixed to the shaft by radial arms and hubs, like the rim of an ordinary pulley or gearwheel.

The baffle-plates may be arranged in an arch form, Fig. 3, or in a complete circular ring form, Fig. 8. The casing or frame of the baffle-plates may also be made polygonal or in any other form, and the plates themselves may be even or curved or formed in a broken line.

Instead of being made of single plates of sheet or bar iron they may be made hollow, as indicated in Fig. 11, and in this case the framing 24, supporting or connecting the oval pipes 23, is also made hollow, and it is provided with inlet and outlet pipes 25, by which steam or hot water may be let in and pass through the pipes 23 and the frame 24, so that the saturated air may at the same time be heated. It thus at the same time assists the dispersion and distribution of the air and fluid.

Finally, there is shown in Figs. 7 and 8 another manner of carrying out my invention. This consists of a pear-shaped casing $1^a$. It has a ventilator $11^a$, fixed at one side or opening, and a narrow outlet-opening $2^a$ opposite thereto. The shaft $4^a$ runs in the same direction, and on it are mounted the disks $8^a$. In order to force the air and fluid through the apparatus in a radial direction, the disks near the entrance side are of ring shape, the central openings in the same getting smaller toward the outlet side, and the last one is made solid, as shown, and thus the current of air and spray-water is forced to pass the baffle-plates 12 before reaching the outlet-tube $2^a$.

Other constructions may be carried out on the same principle of working and based on the same idea, and I do not limit myself to the examples described and represented, these serving merely to show how the idea may be practically carried out to suit various requirements.

Having now described my invention, I declare that what I desire to secure by Letters Patent is—

1. In mechanism for distributing fluid, the combination of a shaft and means for rapidly rotating the same with disks carried by said shaft, a ring of baffle-plates surrounding the said disks, means for presenting fluid in position for said disks to dip into it and scatter it by centrifugal action and means for heating the moist air passing through the apparatus substantially as set forth.

2. In mechanism for distributing fluid, the combination of a shaft and means for rapidly rotating the same with a ventilating-fan and distributing-disks carried by said shaft, a ring of baffle-plates surrounding the said disks, means for presenting fluid to said disks in position for the latter to dip into it and scatter it by centrifugal action and means for heating the air driven by the said ventilator substantially as set forth.

3. In mechanism for distributing fluid, the combination of a shaft and means for rapidly rotating the same with disks carried by said shaft, ventilator-wings located between the said disks also carried by said shaft, and means for presenting fluid to said disks to be centrifugally scattered thereby substantially as set forth.

4. In mechanism for distributing fluid, the combination of a shaft and means for rapidly rotating the same with disks carried by said shaft, a fan also carried by said shaft, means for presenting fluid to said disks to be centrifugally scattered, baffle-plates and frames therefor comprising flat pipes arranged to conduct fluid through said frames and plates to heat the moist air driven by the fan substantially as set forth.

5. In mechanism for distributing fluid, the combination of a shaft and means for rapidly rotating the same, with an inclosing casing having a larger entrance-opening and a smaller discharge-opening arranged respectively near the ends of the shaft, fluid-distributing disks carried by said shaft, the disk near the entrance having a larger opening than the disk near the discharge and baffle-plates arranged to receive the fluid thrown off tangentially by said disks and carry the same away, said baffle-plates being adapted to contain water substantially as set forth.

6. In mechanism for distributing liquid the combination of a shaft and means for rapidly rotating the same with disks carried by said shaft and arranged to dip into said liquid with a series of hollow baffle-plates arranged around said disks and a hollow frame supporting said baffle-plates and connected therewith, said frame and plates being adapted to receive hot fluid for the purpose set forth.

In testimony whereof I have affixed my signature in presence of two witnesses.

CARL HEINRICH PRÖTT.

Witnesses:
 OTTO KÖNIG,
 I. A. RITTERSHAUS.